United States Patent [19]
Henze

[11] Patent Number: 5,926,004
[45] Date of Patent: Jul. 20, 1999

[54] METHOD AND APPARATUS FOR CHARGING ONE OR MORE ELECTRIC VEHICLES

[75] Inventor: Christopher P. Henze, Lakeville, Minn.

[73] Assignee: Schott Power Systems Incorporated, Wayzata, Minn.

[21] Appl. No.: 08/948,408

[22] Filed: Oct. 10, 1997

[51] Int. Cl.[6] .................. H02J 1/00; H02J 7/00; H02M 7/00
[52] U.S. Cl. ............. 320/109; 320/116; 307/82; 363/65
[58] Field of Search .................. 320/108, 109, 320/116, 125; 191/2, 110; 307/43, 80, 82; 363/65, 171

[56] References Cited

U.S. PATENT DOCUMENTS

| | | | |
|---|---|---|---|
| 3,597,673 | 8/1971 | Burkett et al. | 320/5 |
| 3,614,583 | 10/1971 | Burkett et al. | 320/5 |
| 3,617,851 | 11/1971 | Puy et al. | 320/22 |
| 3,881,581 | 5/1975 | Richardson | 191/2 |
| 3,888,336 | 6/1975 | Zajic | 191/1 R |
| 3,940,680 | 2/1976 | Tadokoro et al. | 321/27 R |
| 4,016,474 | 4/1977 | Mason | 320/15 |
| 4,091,319 | 5/1978 | Nguyen | 320/9 |
| 4,211,969 | 7/1980 | Steigerwald | 320/14 |
| 4,253,054 | 2/1981 | Steigerwald | 320/14 |
| 4,270,165 | 5/1981 | Carpenter et al. | 363/65 |
| 4,385,269 | 5/1983 | Aspinwall et al. | 320/14 |
| 4,740,739 | 4/1988 | Quammen et al. | 320/14 |
| 4,800,328 | 1/1989 | Bolger et al. | 320/2 |
| 4,956,597 | 9/1990 | Heavey et al. | 320/14 |
| 4,956,762 | 9/1990 | Loveness et al. | 363/65 |
| 5,057,762 | 10/1991 | Goedken et al. | 320/15 |
| 5,119,008 | 6/1992 | Morita et al. | 320/2 |
| 5,179,335 | 1/1993 | Nor | 320/21 |
| 5,184,058 | 2/1993 | Hesse et al. | 320/4 |
| 5,200,686 | 4/1993 | Lee | 320/2 |
| 5,202,617 | 4/1993 | Nor | 320/2 |
| 5,204,611 | 4/1993 | Nor et al. | 320/21 |
| 5,206,578 | 4/1993 | Nor | 320/14 |
| 5,254,930 | 10/1993 | Daly | 320/15 |
| 5,263,565 | 11/1993 | Wilkinson | 194/216 |
| 5,311,112 | 5/1994 | Creaco et al. | 320/15 |
| 5,323,098 | 6/1994 | Hamaguchi et al. | 320/2 |
| 5,355,073 | 10/1994 | Nguyen | 320/15 |
| 5,371,454 | 12/1994 | Marek | 320/15 |
| 5,396,163 | 3/1995 | Nor et al. | 320/21 |
| 5,398,749 | 3/1995 | Hokari et al. | 187/293 |
| 5,449,995 | 9/1995 | Kohchi | 320/15 |
| 5,460,244 | 10/1995 | Tanahashi | 187/293 |
| 5,483,144 | 1/1996 | Marek | 320/2 |
| 5,498,950 | 3/1996 | Ouwerkerk | 320/18 |
| 5,548,200 | 8/1996 | Nor et al. | 320/27 |
| 5,568,036 | 10/1996 | Hulsey et al. | 320/2 |
| 5,594,318 | 1/1997 | Nor et al. | 320/2 |
| 5,640,059 | 6/1997 | Kammiller et al. | 307/66 |
| 5,768,117 | 6/1998 | Takahhashi et al. | 363/65 |
| 5,803,215 | 9/1998 | Hanze et al. | 191/2 |

FOREIGN PATENT DOCUMENTS

| | | | |
|---|---|---|---|
| 7403570 | 9/1975 | Netherlands | 191/2 |

*Primary Examiner*—Peter S. Wong
*Assistant Examiner*—Gregory J. Toatley, Jr.
*Attorney, Agent, or Firm*—Westman, Champlin & Kelly, P.A.; S. Koehler

[57] ABSTRACT

A method and an apparatus for charging one or more electric vehicles includes a first power converter and a second power converter connectable to a source of electric power to receive electric power therefrom. A switch selectively connects the power converters together to provide combined power to a first power coupler in order to charge one electric vehicle, or connects the power converters to separate power couplers in order to charge a plurality of vehicles.

25 Claims, 7 Drawing Sheets

10
METHOD AND APPARATUS FOR CHARGING ONE OR MORE ELECTRIC VEHICLES

BACKGROUND OF THE INVENTION

The present invention relates to a method and an apparatus for charging one or more electric vehicles.

Electric vehicles are being developed as an alternative to vehicles powered by petroleum based fuels such as gasoline. Advantages of electrically powered vehicles include the lack of exhaust pollutants emitted during the combustion process as well as a reduction in noise.

As is well known, one of the significant drawbacks to an electric vehicle is the storage capabilities of on-board batteries used to power the vehicle. Typical commuter electric vehicles have on-board batteries that have a capacity of 10 kW-hr to 25 kW-hr. This amount of energy will allow the vehicle to operate for a limited period of time, depending on the terrain, the speed of operation and the number of miles traveled before the batteries must again be recharged. It is believed that buses or other larger vehicles will have to be charged on a daily basis, if not more frequently.

Many modern electric vehicle battery charging systems are typically self-contained units for charging a single vehicle. A typical prior art charger system includes a utility interface having over-current protection, EMI filtering and lighting protection. Preferably, a high power factor rectifier and a low pass filter convert alternating current utility power to a direct current (DC). A switch-mode DC-AC inverter operating at high radio frequencies (RF) and a RF rectifier and another low pass filter transfer power to a device connectable to the vehicle battery. Overall control of the battery charging system is performed on the vehicle, although it may also be controlled off the vehicle. A battery management system sends signals to an off-board charger to adjust the current delivered to the battery or batteries. Complex charge algorithms are used in order to maximize efficiency and fully charge the batteries. A controller in the off-board charger receives the signals from the battery management system and sends signals to the power electronics in order to respond to the demand of the battery management system.

The components of the electric vehicle battery charging system can be located on or off the vehicle. At some point, the power must be coupled to the vehicle in order to charge the batteries. This coupling is performed by an interface device that determines which components of the charging system are on the vehicle and which are off the vehicle. The Society of Automotive Engineers (SAE) has advanced three well known techniques for electric vehicle charging systems. These techniques are differentiated from each other by the physical and electrical characteristics used to couple the charging system to the vehicle and transfer power to the vehicle battery. The three techniques include AC conductive coupling, DC conductive coupling and inductive coupling.

Electric vehicle battery charging can be done overnight with equalization or rapidly without equalization. "Equalization" ensures each battery of a plurality of batteries connected in series retains approximately the same charge. To equalize the batteries in an electric vehicle, energy must be provided in relatively small amounts (typically 1 kW or less) and for an extended time (typically four or more hours). This charging technique fully charges each of the batteries and has been shown to increase the useful life of the batteries. During rapid charging, power is provided to the batteries at the maximum rate allowed. Total power transfer can be in the range of 25 kW to 300 kW; however, the charging time is typically one half hour or less.

Even with rapid charging, there is still a well established need for slow or overnight charging, for example, when electric energy rates are lower. One method for charging a fleet of vehicles would be to have one slow charger per electric vehicle and one or a few separate rapid chargers. The slow chargers are used to charge the entire fleet overnight, while the rapid chargers would be used during the day as needed and as available in order to rapidly charge a vehicle from the fleet.

Since it is common practice for the on-board controller to control the charging process between the battery charger and the electric vehicle, the battery charger must be able to operate over a wide range of power transfer operating points. This requirement can cause significant losses in the power transfer path. For instance, in the case of an inductively coupled charger that operates according to SAE (Society of Automotive Engineers) standard J-1773, the switching frequency of the charger is modulated to change the output power delivered to the vehicle. Such chargers have a power stage that is a series resonant converter that operates above resonance. As the operating frequency is increased above resonance, the power delivered decreases. This control method provides one of the most common means of controlling the converter.

There is an ongoing need to have a charger that can charge a number of vehicles, each having its own maximum power transfer rating. Each vehicle would then control the charger and request power at its own safe level. Some vehicles can, and expect, to receive power rapidly (for example, 50 kW) while others can only handle power at relatively low charge rates (for example, 6.6 kW). As described above, an inductive battery charger can increase its operating frequency in order to lower the available output power. Unfortunately, the losses in many components on the vehicle are frequency dependent and the vehicle which operates fine at a given power level at a selected operating frequency may fail if operated at the same power level at a significantly increased operating frequency. The losses in the on-board components such as diodes, capacitors, copper conductors and couplers may be proportional to the operating frequency for a fixed output power. In addition, insufficient cooling is typically common in most existing designs (developed for low power charging (6.6 kW maximum)), thus causing extra thermal stress on components which can lead to failure if the operating frequency is increased for a given output power.

SUMMARY OF THE INVENTION

A method and an apparatus for charging one or more electric vehicles includes a first power converter and a second power converter connectable to a source of electric power to receive electric power therefrom. A switch selectively connects the power converters together to provide combined power to a power coupler in order to charge one electric vehicle, or connects the power converters to separate power couplers in order to charge a plurality of vehicles.

In a first aspect of the present invention, the switch connects the second power converter to the power coupler and to the first power converter in order to transfer electric power when the first power converter is also transferring electric power. In one embodiment, the maximum power transfer rates are equal. In another embodiment, a maximum power transfer rating of the first power converter is greater than a maximum power transfer rating of the second power converter. This allows the vehicle battery charger to be sized appropriately to best match the capabilities of the charge port and other charging components in the power transfer path on the vehicle.

A second aspect of the present invention is a vehicle battery charger having, preferably, two power couplers of different ratings connectable to associated charge ports of different vehicles to transfer power. The first power coupler has a first maximum transfer rating, while the second power coupler has a second maximum transfer rating which is less than the first maximum transfer rating. In this embodiment, the switch selectively connects the first power converter and the second power converter to the first power coupler in order to, for example, rapidly charge a vehicle at the first maximum transfer rating. In a second operating position, the switch separately connects the first power converter to the first power coupler and the second power converter to the second power coupler in order to charge a plurality of vehicles.

DETAILED DESCRIPTION OF THE PREFERRED EMBODIMENTS

Figure 1:
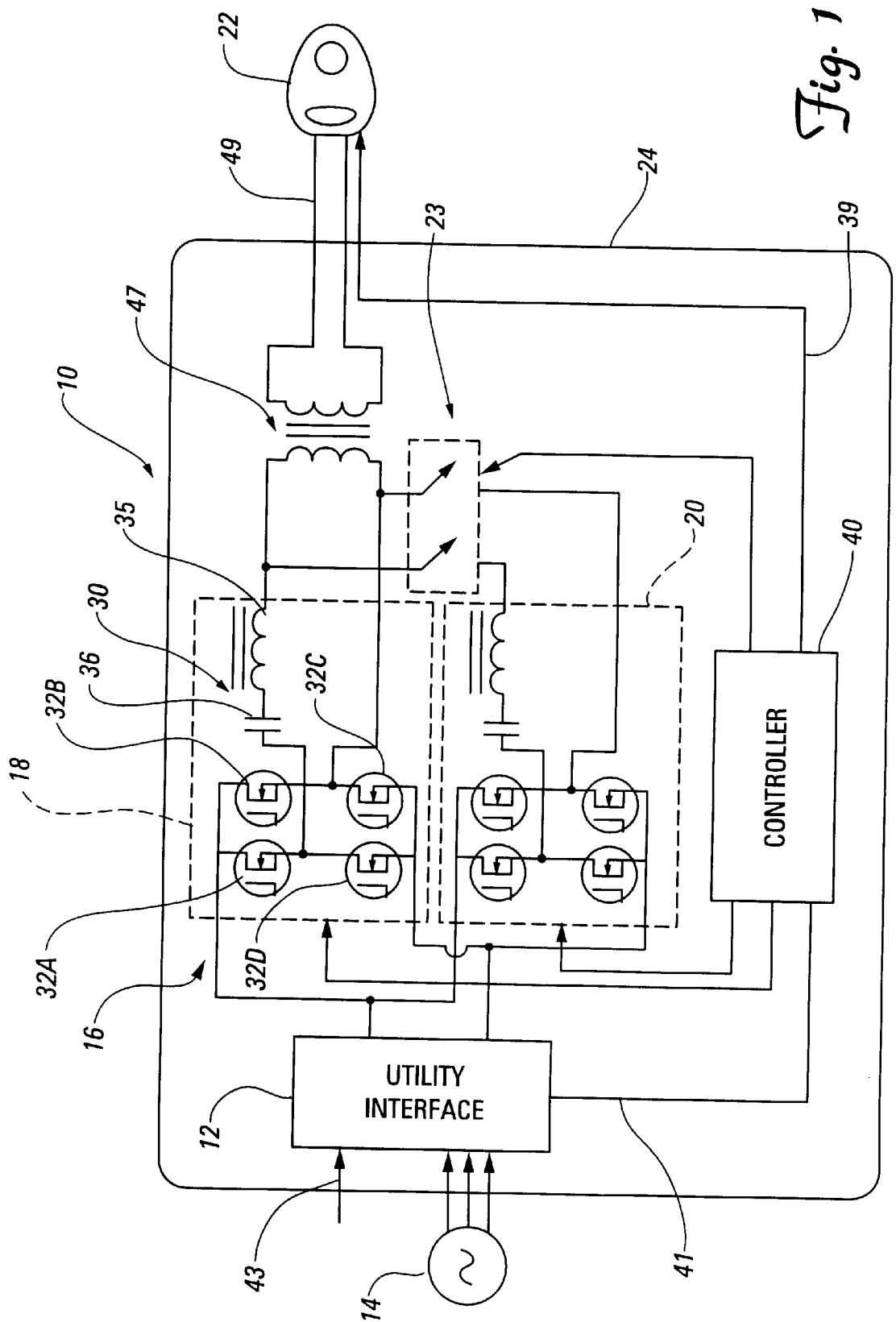
FIG. 1 is a schematic diagram of a first embodiment of an electric vehicle charging system of the present invention.

A first embodiment of an electric vehicle charging system 10 of the present invention is illustrated in FIG. 1. Generally, the electric vehicle charging system 10 includes a utility interface 12 that converts electric power supplied from a source of electric power 14, such as a utility system grid, to a distribution bus 16. Power converters 18 and 20 receive power from the distribution bus 16. A power coupler 22 is connectable to a charge port, not shown, but well known in the art to transfer power to electric batteries present on a vehicle. The first power converter 18 receives electric power from the source of electric power 14 and converts electric power from the source of electric power 14, transferring the electric power to the power coupler 22. Similarly, the second power converter 20 converts electric power from the source of electric power 14 and transfers the electric power to the power coupler 22. A switch 23 selectively connects the second power converter 20 to the power coupler 22 and the first power converter 18 to transfer electric power when the first power converter 18 is also transferring electric power. By selectively connecting the second power converter 20 to also provide electric power when needed, the charging system 10 can be configured as needed to most efficiently charge a vehicle battery, depending on different charging demands and capabilities of the charge port on the vehicle.

In a preferred embodiment, the utility interface 12, the distribution bus 16, the power converters 18 and 20 and the switch 23 are enclosed within a single housing 24. Typically, the source of electric power 14 comprises three-phase alternating current supplied from a utility system grid, but could also be a wind generator, solar array, or other devices (AC or DC) generating electric power. In the embodiment illustrated, the alternating current electric power is converted to direct current electric power for distribution on the distribution bus 16. Conversion of AC current to DC current is well known and the utility interface 12 includes a transformer, a rectifier circuit, a soft-start circuit, a filtering circuit and circuit protection devices as needed, or as desired, to perform this function. The utility interface 12 converts the AC power to a selected DC voltage that is provided on the distribution bus 16. The distribution bus 16 provides the DC voltage to the power converters 18 and 20. In one embodiment, the power converters 18 and 20 are similarly constructed, but have different maximum power transfer ratings. Referring to the power converter 18 by way of example, the power converter 18 includes a high frequency resonant tank circuit 30 that receives the DC voltage from the utility interface 12. The high frequency resonant tank circuit 30 includes switching devices 32A, 32B, 32C and 32D connected in a bridge circuit. The resonant tank circuit 30 includes an inductive element (formed from the leakage inductance of the take-apart power coupler 22 and a separate inductor 35) and a series connected capacitor 36. The resonant tank circuit 30 has a self-resonant frequency that is slightly below the operating range of the power converter 18 at which the resonant tank circuit 30 has a minimum impedance. As the operating frequency of the power converter 18 is increased, the impedance of the resonant tank circuit 30 also increases, causing the amount of power to be delivered through the power coupler 22 to be reduced. An optional output transformer 47 couples each of the power converters 18 and 20 to the power coupler 22. The transformer 47 provides an additional insulation barrier as well as a voltage step up and a current step down function for lighter weight coupling cables 49.

A controller 40 provides control signals, with appropriate relative timing (phase relativity), to the switching devices 32A–32D to obtain the desired operating frequency. The controller 40 receives power charging requests on signal line 39 from an on-board controller, not shown, on the vehicle using a suitable RF transceiver, as required by SAE standards J-1773 and J-2293. The controller provides control signals to the utility interface 12 on signal line 41. If desired, the controller 40 also communicates with the source of electric power 14 as indicated at 43 in order to determine available power that can be used for charging.

The electric vehicle charging system 10 illustrated in FIG. 1 is designed so as to be able to individually charge a plurality of different vehicles having different charging demands. For instance, when it is desirable to charge a vehicle rapidly, the switch 23 is closed, preferably being operated by the controller 40, in order that electric power from both of the power converters 18 and 20 can be supplied to the power coupler 22. As stated, the power controller 40 controls each of the power converters 18 and 20 by changing the operating frequency of the power converters 18 and 20. Preferably, the power controller 40 controls the power converters 18 and 20 to have substantially the same operating frequency.

In the embodiment illustrated, the first power converter 18 and the second power converter 20 have different maximum power transfer ratings. For example, the first power converter 18 can have a maximum power transfer rating of 12.5 kW, while the second power converter 20 has a maximum power transfer rating of 37.5 kW. In this manner, when the first power converter 18 and the second power converter 20 are both supplying power to the power coupler 22 (i.e., when the switch 23 is closed), a total of up to 50 kW is provided through the power coupler 22 to the vehicle under charge.

However, some vehicles cannot except power at a rapid or a high charging rate, for example, 50 kW. Rather, these vehicles must be charged at a slower rate, for example, 6.6 kw. As stated above, it is typical in the prior art to increase the operating frequency of the charger in order to reduce power flow to the vehicle. The typical operating frequency for a charger operating at maximum power is approximately 120 kHz. For the prior art rapid charger (capable of operating at 25 kW maximum) to operate at a significantly lower charging rate (6 kW, for example), the operating frequency must be increased, for example, to 200 kHz. Unfortunately, the losses in many components in the vehicle are frequency dependent such that losses would increase substantially and/or components on a vehicle would fail if operated at the increased operating frequency. The electric vehicle charging system 10 solves this problem by selectively connecting the power converters 18 and 20 with the switch 23 in order to efficiently transfer power to the vehicle based upon the capability of the vehicle. Thus, when a vehicle is capable of and requests rapid charging, the switch 23 can be closed to provide maximum power through the power coupler 22. In other situations where the vehicle cannot accept the high charging rate, the switch 23 can be opened wherein the power converter 18 provides power through the power coupler 22 at the preferred operating frequency. It should be understood that although switch 23 is illustrated wherein the power converter 18 is always connected to the power coupler 22, a suitable switch can be used so as to select the power converter 18 or the power converter 20 separately as well as provide power simultaneously when desired.

Figure 2:
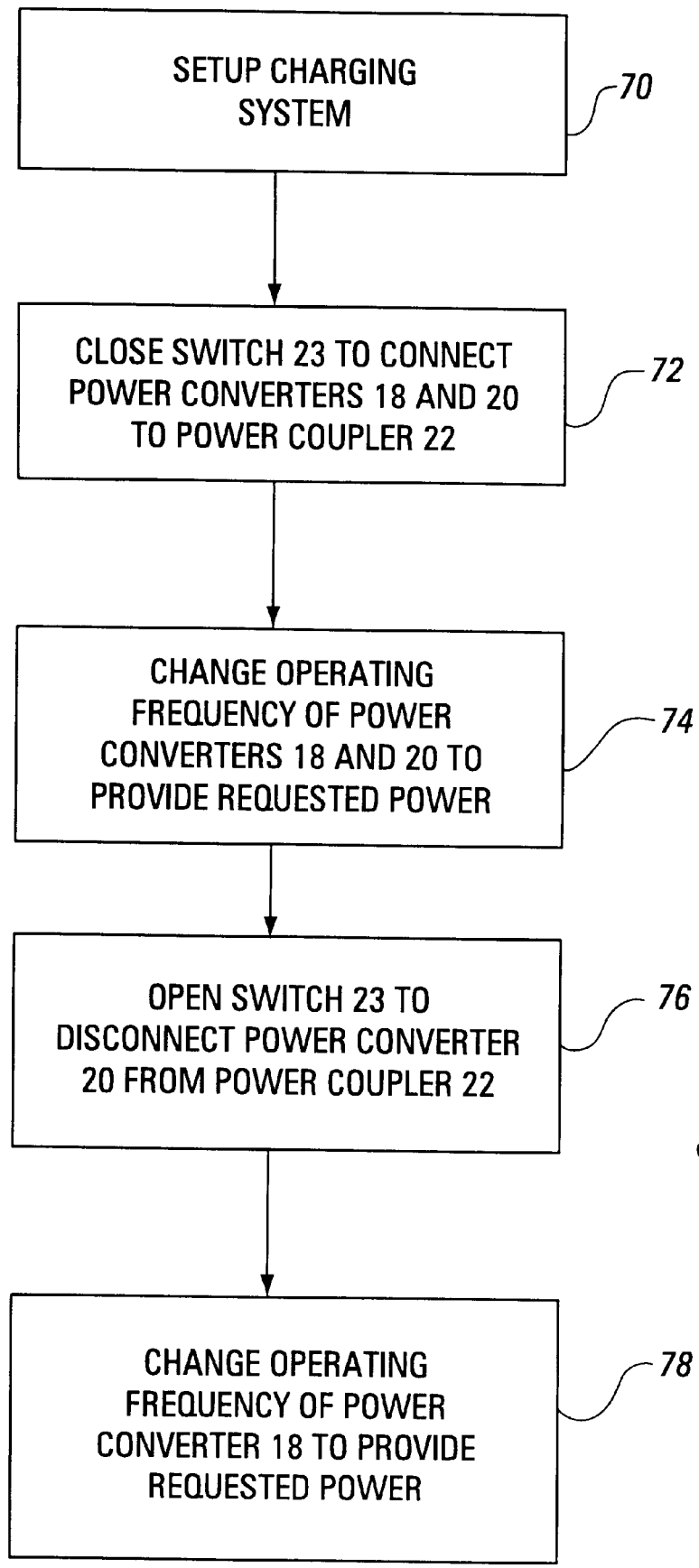
FIG. 2 is a flow diagram of a method of operation of the embodiment of FIG. 1.

FIG. 2 illustrates a method of operation of the apparatus of FIG. 1. Operation begins at block 70 where the charging system 10 is set up for operation. Setup can include configuration of the utility interface 12 to accept power from the power source 14, any account information from the operator for billing purposes as well as insertion of the power coupler 22 into the vehicle charging port. Assuming that a high rate of charge is requested from the vehicle, the controller 40 closes the switch 23 to connect the power converters 18 and 20 to the power coupler 22 at block 72. A suitable operating frequency is then selected for the power converters 18 and 20. For instance, an operating frequency is chosen in order to provide a maximum charge rate through power coupler 22. At block 74, the operating frequency of the power converters 18 and 20 is changed as a function of corresponding changes in the requested power. Typically, the requested power decreases during charging such that the operating frequency increases as discussed above. However, the requested power can increase, if desired, where in such a case, the operating frequency may increase.

Assuming that the requested power has fallen to a level that can be provided by the power converter 18 without the power converter 20, the switch 23 is opened (preferably, while momentarily ceasing changing of the vehicle battery) to disconnect the power converter 20 from the power coupler 22 at block 76. The operating frequency of the power converter 18 is then adjusted to provide the requested power at block 78. Typically, the operating frequency will be reduced in order that the power converter 18 can provide the requested power by itself. As stated above, when the power converters 18 and 20 are both supplying power to the power coupler 22, at low power levels, the operating frequency is higher, which leads to higher losses. However, when the switch 23 is open and only the power converter 18 is providing the requested power, the operating frequency can be lowered thereby increasing efficiency. The operating frequency of the power converter 18 is then changed in order to provide the requested power in order to complete charging of the vehicle batteries.

Figure 3:
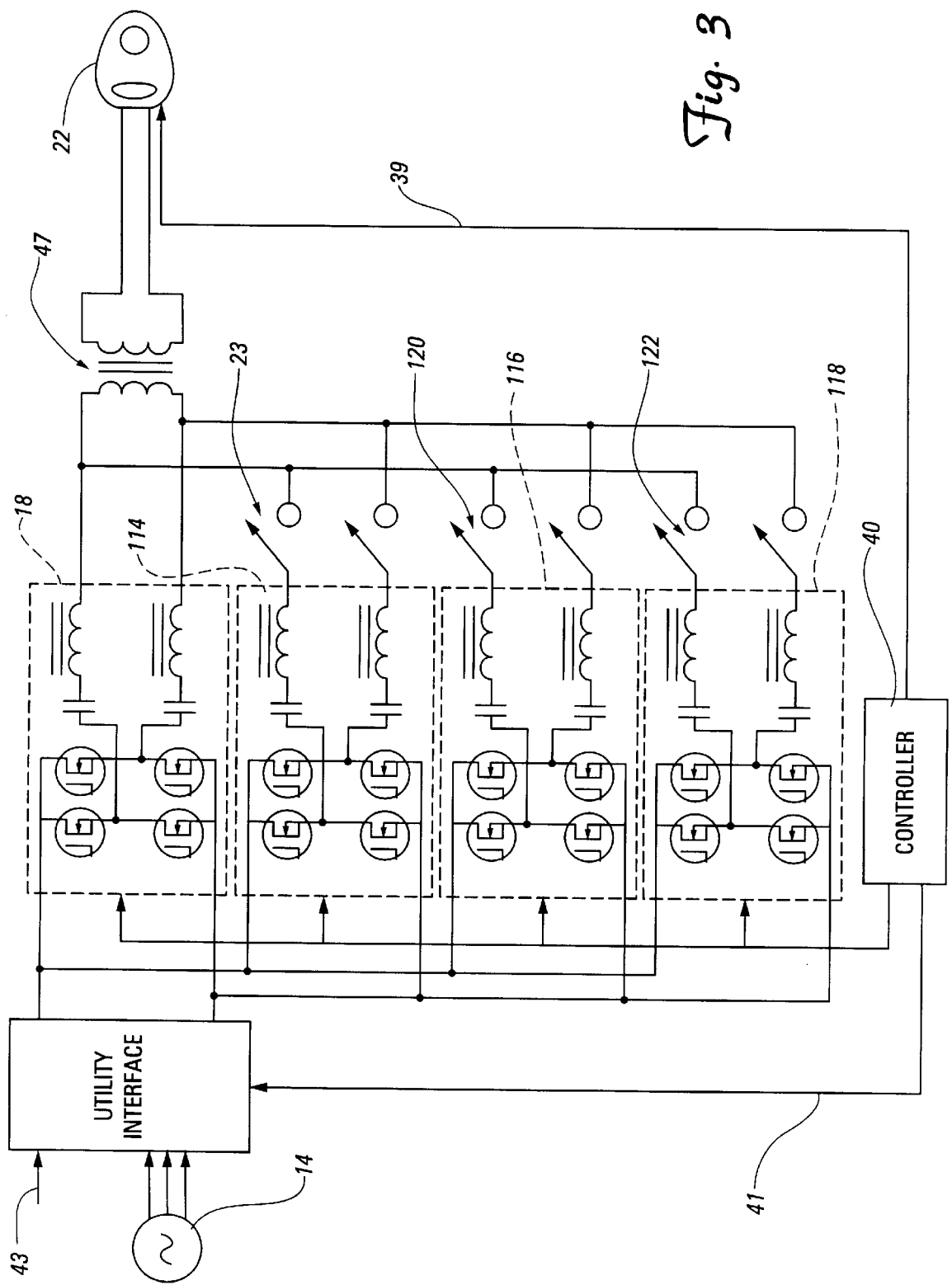
FIG. 3 schematic diagram of a second embodiment of an electric vehicle charging system of the present invention.

FIG. 3 illustrates a vehicle electric charging system 110 having power converters 18, 114, 116 and 118. In the embodiment illustrated, each of the power converters 18, 114, 116 and 118 have the same power rating. The switch 23 again selectively connects the power converters 18, 114, 116 and 118 together in order to provide maximum power flow through the power coupler 22. If desired, additional switches 120 and 122 can be provided to provide other operating configurations with other maximum power transfer ratings.

Figure 4:
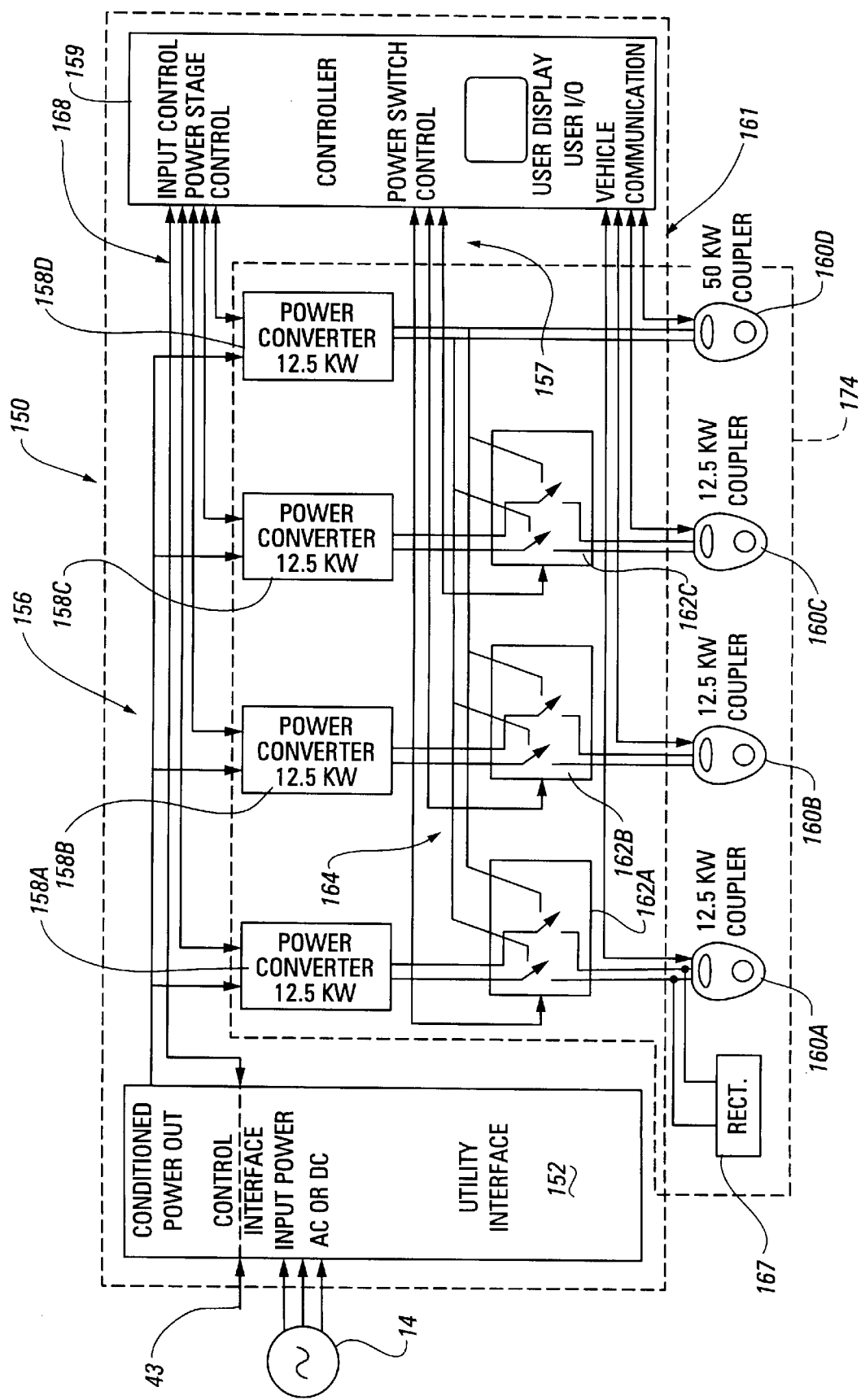
FIG. 4 is a schematic diagram of a third embodiment of an electric vehicle charging system of the present invention.

A third embodiment of an electric vehicle charging system 150 of the present invention is illustrated in FIG. 4. The electric vehicle charging system 150 includes components similar to the embodiments described above wherein a utility interface 152 converts electric power supplied from the source of electric power 14 to a distribution bus 156. Power converters 158A, 158B, 158C and 158D receive power from the distribution bus 156. Each power converter 158A–158D is capable of being connected to a corresponding individual power coupler 160A, 160B, 160C and 160D. In particular, switches 162A, 162B and 162C are interposed between the power converters 158A–158C and the power couplers 160A–160C, respectively. Each switch 162A–162C has two operating positions. Referring to switch 162A by way of example, in a first operating position, the switch 162A electrically connects the power converter 158A to the power coupler 160A as illustrated in FIG. 4. In a second operating position illustrated in FIG. 5, the switch 162A electrically connects the power converter 158A to a transfer bus 164. The transfer bus 164 is connected to the power coupler 160D. Thus, in the second operating position, power from the power converter 158A is provided to the power coupler 160D along with the power from the power converter 158D.

Figure 5:
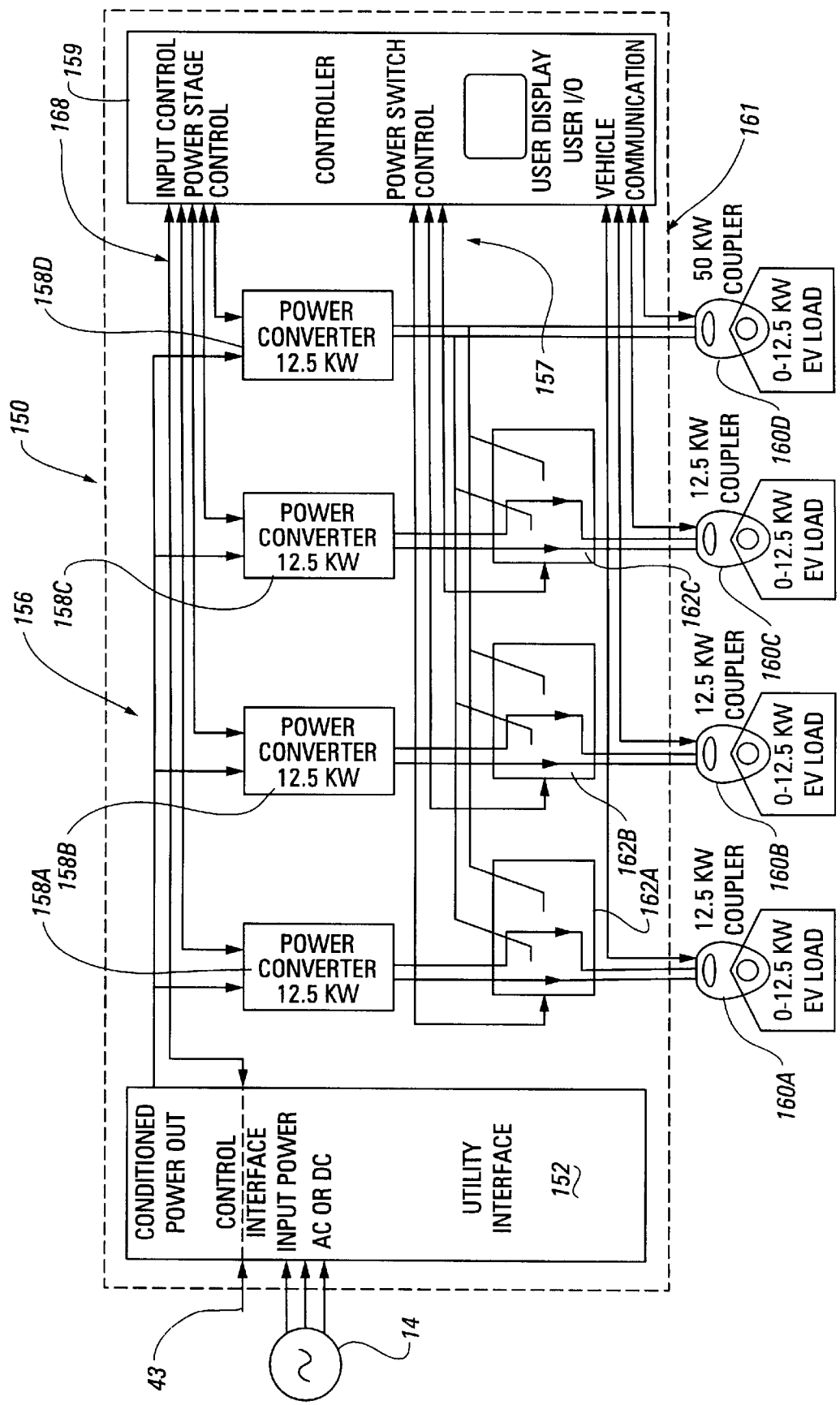
FIG. 5 is a schematic diagram of the third embodiment in a first electrical configuration.

The electric vehicle charging system 150 can be configured dynamically for charging one or more electric vehicles, depending upon the charging requirements of the vehicles. FIG. 5 illustrates a first electrical configuration wherein the electric vehicle charging system 150 is used to charge a plurality of vehicles at a relatively slow charging rate, for example, overnight. As illustrated, each of the switches 162A–162C is placed in the first operating position so as to individually connect the power converters 158A–158C to the power couplers 160A–160C, respectfully. In this configuration, no power is transmitted through the transfer bus 164 wherein the power coupler 160D receives power only from the power converter 158D. Communication between a controller 159 and on-board controllers of the vehicles under charge is through signal lines 161. The switches 162A–162C are controlled by the controller 159 through signal lines 157.

Figure 6:
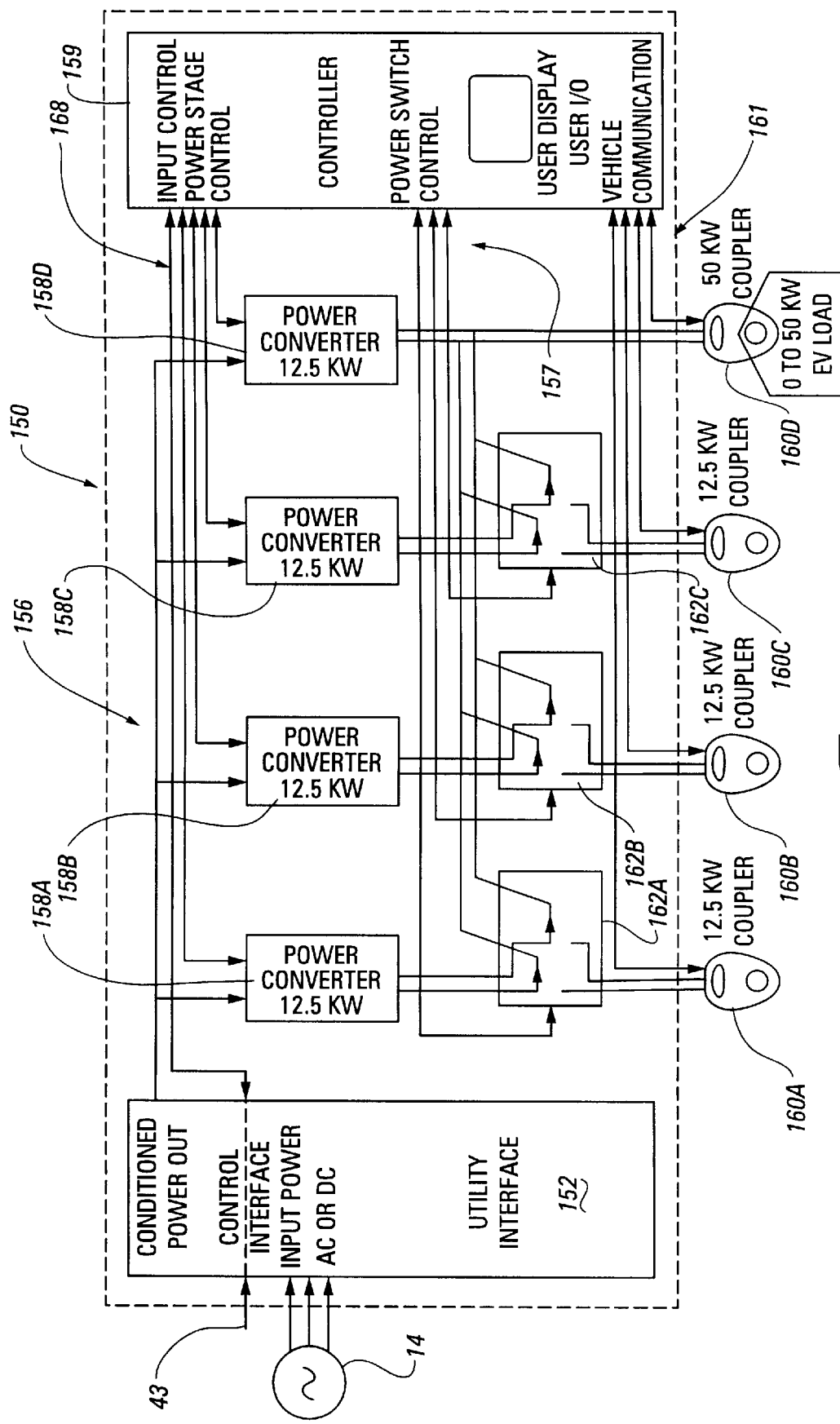
FIG. 6 is a schematic diagram of the third embodiment in a second electrical configuration.

FIG. 6 illustrates a second electrical configuration wherein each of the switches 162A–162C is placed in the second operating position to transfer power from the power converters 158A–158C to the transfer bus 164. In this electrical configuration, all power from the power converters 158A–158D is transferred to the power coupler 160D. The power coupler 160D has a power transfer rating greater than the transfer rating of the power couplers 160A–160C which, in this embodiment, are the same.

In the embodiment illustrated, the power couplers 160A–160D are inductive wherein the operating frequency of the power converters 158A–158D is controlled by the controller 159 along signal lines 168. Preferably, when each of the power converters 158A–158D are supplying power to the power coupler 160D, the operating frequency and phase relationship of each of the power converters 158A–158D is the same.

Figure 7:
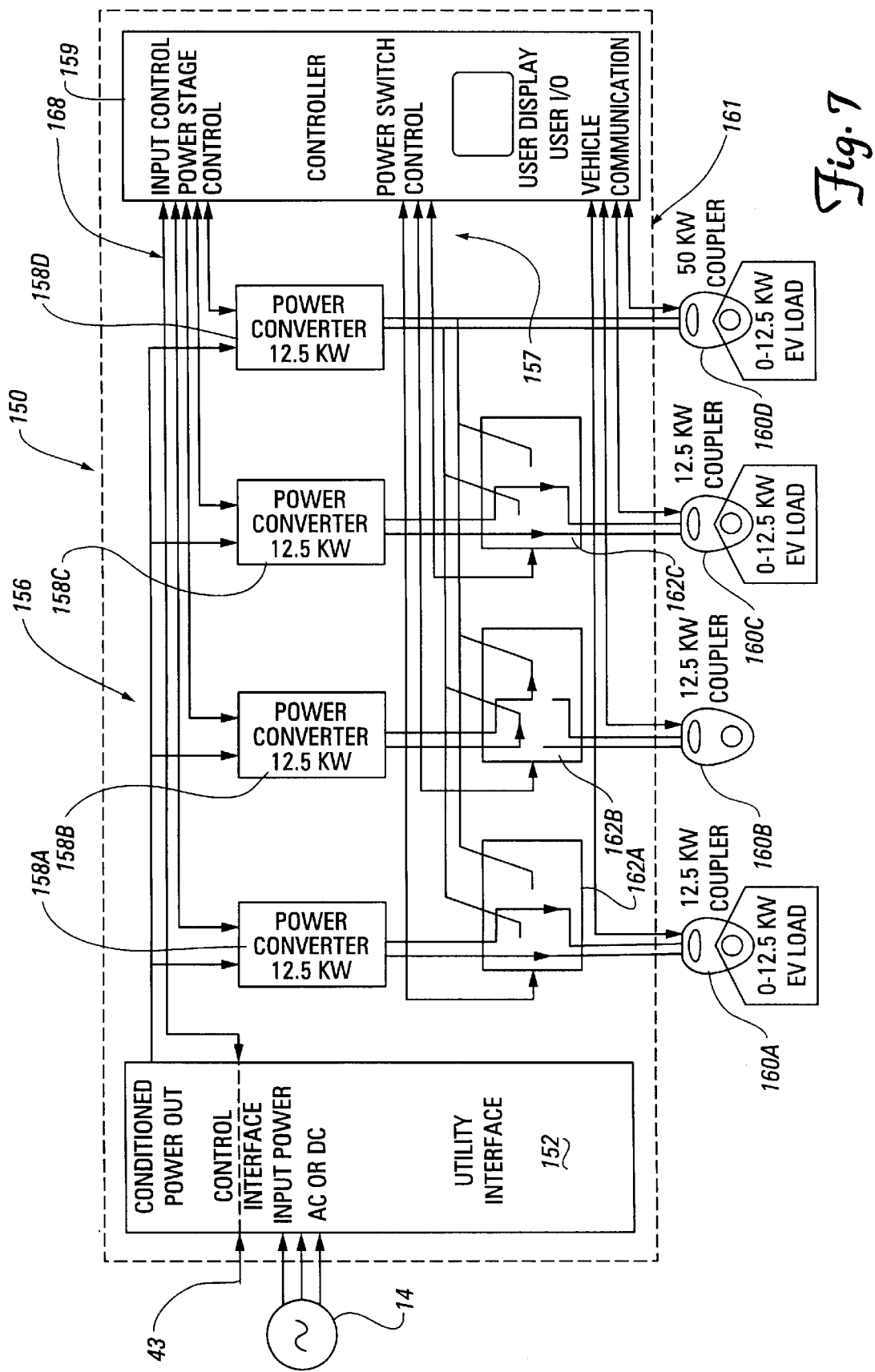
FIG. 7 is a schematic diagram of the third embodiment in a third electrical configuration.

FIG. 7 illustrates a third electrical configuration for the electrical vehicle charging system 150. In this configuration, switches 162A and 162C are placed in the first operating position so as to connect the power converters 158A and 158C to the power couplers 160A and 160C, respectively. The switch 162B, however, is placed in the second operating position so as to transfer power from the power converter 158B to the transfer bus 164 such that power from the power converters 158B and 158D is provided to the power coupler 160D. In this manner, two vehicles can be charged at a slower charge rate, while a third vehicle, connected to the power coupler 160D, can be charged at a faster charge rate.

In addition, it should be understood that charging of vehicles can change dynamically depending on, for example, a new vehicle showing up. For example, assume that a vehicle requesting 50 kW were to be connected to the power coupler 160D in FIG. 7, while power couplers 160A and 160C were providing charge to vehicles at 12.5 kW. Upon honoring the request from the vehicle connected to the power coupler 160D, the controller 159 will change the operating position of the switches 162A and 162C, thereby disconnecting the power couplers 160A and 160C from the power converters 158A and 158C, respectively, in order to transfer all power to the power coupler 160D. In a manner similar to that described above with respect to operation of the charging system 10 in FIG. 1 according to the flow chart of FIG. 2, the power converters 158A–158C will be disconnected when the power requested through the power coupler 160D falls below levels that can be provided with less than all of the power converters 158A–158D. For example, if the power required through the power coupler 160D falls below 37.5 kW, the switch 162A can be changed to connect the power coupler 160A to the power converter 158A in order to continue charging of the vehicle connected thereto. Likewise, once the power level through the coupler 160D has fallen below 25 kW, the switch 162C can be changed to connect the power coupler 160C to the power converter 158C in order to continue charging of that vehicle.

The electric vehicle charging system 150 maximizes flexibility while reducing manufacturing costs. By employing separate power converters 158A–158D, a plurality of vehicles can be charged at a relatively slow charging rate. However, the electrical vehicle charging system 150 can also be configured so that a vehicle can be rapidly charged by combining the output power from two or more of the power converters 158A–158D. This reduces manufacturing costs since it is not necessary to build a power converter dedicated to only rapid charging and others dedicated to slow charging. Although illustrated wherein the power converters 158A–158D have the same power conversion rating, it should be understood that power converters having different ratings can also be used. Likewise, although illustrated wherein the switches 162A–162C can only transfer power to the power coupler 160D, suitable switches can be implemented to divert power to any of the other power couplers 160A–160C, if desired.

Referring back to FIG. 4, although illustrated wherein inductive couplers have been used throughout the embodiments, it should be understood that conductive couplers can be used instead of, or in addition to, the inductive couplers. FIG. 4 illustrates a DC conductive power coupler 165 connected to the switch 162A through a rectifier 167. The DC conductive power coupler 165 allows the charging apparatus 150 to charge vehicles having DC conductive charge ports as well as those vehicles having inductive charge ports wherein the power coupler 160A can be used. The power converter 158A operates in the same manner whether the DC conductive power coupler is being used or the inductive power coupler 168 is being used. Suitable electronic converters could also be used with AC conductive power couplers.

Referring also to FIG. 4, the power converters 158A-158D and the power couplers 160A–160D can be grouped together to form a vehicle charging station 174, which can charge one or more vehicles in the manner described above. Other vehicle charging stations 174 can also be connected to the distribution bus 156 to form a larger electric vehicle charging system. Such a system and method for charging a plurality of vehicles are described in co-pending application entitled "METHOD AND APPARATUS FOR CHARGING A PLURALITY OF ELECTRIC VEHICLES" having Ser. No. 08/787,208 and filed on Jan. 22, 1997, which is hereby incorporated in its entirety by reference.

Although the present invention has been described with reference to preferred embodiments, workers skilled in the art will recognize that changes may be made in form and detail without departing from the spirit and scope of the invention. For instance, although described where power flow has been controlled by changing operating frequencies, other techniques to vary power delivered can be used with the present invention, such as pulse width modulation at a constant frequency, or phase shift modulation. In addition, the power converters can be connected in series if desired, rather than in parallel as illustrated.

What is claimed is:

1. A vehicle battery charger for charging a vehicle through a charge port, the vehicle battery charger comprising:
   a power coupler connectable to the charge port to transfer power;
   a first power converter operably connected to the power coupler and connectable to a source of electric power to receive electric power, the first power source converter capable of converting electric power from the source of electric power and transferring the electric power to the power coupler;
   a second power converter operably connectable to the power coupler and connectable to the source of electric power to receive electric power, the second power converter capable of converting electric power from the source of electric power and transferring the electric power to the power coupler; and
   a switch selectively connecting the second power converter to the power coupler and the first power converter to transfer electric power when the first power converter is also transferring electric power.

2. The vehicle battery charger of claim 1 and further comprising a controller operably connected to the first power converter to control power transferred to the charge port and operably connected to the second power converter to control power transferred to the charge port.

3. The vehicle battery charger of claim 2 wherein the power coupler is inductive.

4. The vehicle battery charger of claim 3 wherein the first power converter and the second power converter each include means for varying a frequency of the power transferred.

5. The vehicle battery charger of claim 4 wherein when the switch is closed, the controller controls the means for varying the frequency of the first power converter and the means for varying the frequency of the second power converter to have substantially the same frequency.

6. The vehicle battery charger of claim 1 wherein the switch connects the first power converter and the second power converter in parallel.

7. The vehicle battery charger of claim 2 wherein the power coupler is conductive.

8. The vehicle battery charger of claim 2 wherein the controller is operably connected to the switch to control the switch.

9. The vehicle battery charger of claim 1 wherein a maximum power transfer rating of the first power converter is not equal to a maximum power transfer rating of the second power converter.

10. The vehicle battery charger of claim 1 and further comprising:
   a third power converter operably connectable to the power coupler and connectable to the source of electric power to receive electric power, the third power source converter capable of converting electric power from the source of electric power and transferring the electric power to the power coupler; and
   wherein the switch selectively connects the third power converter to the power coupler and the first power converter to transfer electric power when the first power converter is also transferring electric power.

11. The vehicle battery charger of claim 10 wherein the switch selectively connects the third power converter to the power coupler, the first power converter and the second power converter to transfer electric power when the first power converter and the second power converter are also transferring electric power.

12. A vehicle battery charger for charging vehicles through associated charge ports, the vehicle battery charger comprising:
   a first power coupler connectable to a first charge port to transfer power;
   a second power coupler connectable to a second charge port to transfer power;
   a first power converter connectable to a source of electric power for converting electric power from the source of electric power and transferring the electric power to one of the power couplers;
   a second power converter connectable to the source of electric power for converting electric power from the source of electric power and transferring the electric power to one of the power couplers; and
   a switch assembly selectively connecting the first power converter and the second power converter to the first power coupler in order to charge a battery of a single vehicle or the first power converter to the first power coupler and the second power converter to the second power coupler in order to charge batteries of two separate vehicles.

13. The vehicle battery charger of claim 12 wherein the first power coupler has a first maximum transfer rating, and the second power coupler has a second maximum transfer rating less than the first maximum transfer rating.

14. The vehicle battery charger of claim 13 and further comprising a third power coupler connectable to a third charge port to transfer power, the second power coupler having a third maximum transfer rating less than the first maximum transfer rating.

15. The vehicle battery charger of claim 14 wherein the maximum power transfer rating of the second power coupler is equal to the maximum power transfer rating of the third power coupler.

16. The vehicle battery charger of claim 12 and further comprising a controller operably connected to the first power converter to control power transferred from the first power converter and operably connected to the second power converter to control power transferred from the second power converter.

17. The vehicle battery charger of claim 16 wherein the controller is operably connected to the switch to control the switch.

18. The vehicle battery charger of claim 16 wherein the first power coupler is inductive.

19. The vehicle battery charger of claim 18 wherein at least one of the second power coupler and the third power coupler is conductive.

20. The vehicle battery charger of claim 18 wherein the first power converter and the second power converter each include means for varying a frequency of the power transferred.

21. The vehicle battery charger of claim 20 wherein when the switch assembly is operated to connect the first power converter and the second power converter to the first power coupler, the controller controls the means for varying the frequency of the first power converter and the means for varying the frequency of the second power converter to have substantially the same frequency.

22. The vehicle battery charger of claim 12 wherein the switch assembly connects the first power converter and the second power converter in parallel.

23. The vehicle battery charger of claim 12 wherein the first and second power couplers are conductive.

24. The vehicle battery charger of claim 12 wherein the first and second power couplers are inductive.

25. A method for charging a vehicle through a charge port, the method comprising:
   providing a power coupler connectable to the charge port to transfer power; a first power converter for converting electric power from a source of electric power and transferring the electric power to the power coupler, the first power converter having a power transfer rating; and a second power converter for converting electric power from the source of electric power and transferring the electric power to the power coupler; and
   connecting the first power converter to the power coupler to transfer power to the power coupler for power levels less than or equal to the power transfer rating, and connecting the first power converter and the second power converter to the power coupler to transfer power to the power coupler for power levels exceeding the power transfer rating.

* * * * *

UNITED STATES PATENT AND TRADEMARK OFFICE
CERTIFICATE OF CORRECTION

PATENT NO. : 5,926,004
DATED : July 20, 1999
INVENTOR(S) : Henze

It is certified that error appears in the above-identified patent and that said Letters Patent is hereby corrected as shown below:

Claim 14, line 2, after "connectable" insert --to the power converters and--.

Claim 14, line 3, cancel "second" and insert --third--.

Claim 17, line 2, after "switch" insert --assembly--.

Claim 17, line 3, after "switch" insert -assembly--.

Claim 19, line 1, after "wherein" insert --the power coupler is inductive and--.

Claim 19, line 2, delete "least one of".

Claim 19, lines 2 and 3, delete "and the third power coupler".

Claim 20, line 1, delete "18" and insert --16--.

Signed and Sealed this

Tenth Day of October, 2000

Attest:

Q. TODD DICKINSON

*Attesting Officer*     *Director of Patents and Trademarks*